(12) United States Patent
Shah-Hosseini

(10) Patent No.: US 8,370,181 B2
(45) Date of Patent: Feb. 5, 2013

(54) SYSTEM AND METHOD FOR SUPPLY CHAIN DATA MINING AND ANALYSIS

(75) Inventor: Amin Shah-Hosseini, Santa Clara, CA (US)

(73) Assignee: Camstar Systems, Inc., Charlotte, NC (US)

( * ) Notice: Subject to any disclaimer, the term of this patent is extended or adjusted under 35 U.S.C. 154(b) by 621 days.

(21) Appl. No.: 12/579,106

(22) Filed: Oct. 14, 2009

(65) Prior Publication Data

US 2010/0095158 A1 Apr. 15, 2010

Related U.S. Application Data

(60) Provisional application No. 61/105,255, filed on Oct. 14, 2008.

(51) Int. Cl.
*G06Q 30/00* (2006.01)
(52) U.S. Cl. ............... 705/7; 705/8; 705/9; 705/10
(58) Field of Classification Search ............ 705/7, 8, 705/9, 10
See application file for complete search history.

(56) References Cited

U.S. PATENT DOCUMENTS

| | | | | |
|---|---|---|---|---|
| 5,596,712 A * | 1/1997 | Tsuyama et al. | ............... | 714/26 |
| 2005/0216429 A1 * | 9/2005 | Hertz et al. | ............... | 707/1 |
| 2006/0178918 A1 * | 8/2006 | Mikurak | ............... | 705/7 |
| 2007/0124130 A1 * | 5/2007 | Brunet et al. | ............... | 703/23 |
| 2009/0271066 A1 * | 10/2009 | Underdal et al. | ............... | 701/35 |

* cited by examiner

*Primary Examiner* — Nga B. Nguyen
(74) *Attorney, Agent, or Firm* — Christie, Parker & Hale, LLP

(57) ABSTRACT

A method and system for supply chain data analysis. The method includes storing supply chain data including test data, genealogy data, repair data, some factors and some items, in one or more databases and selecting a portion of the factors from the stored data, and a time range for analysis. The method then selects one or more criterion for analysis; extracts a portion of the stored data; analyzes the extracted portion of the stored data to detect a combination of factors that result in a test failure, according to the selected factors, the time range, and the selected one or more criterion. The method then detects a root cause for the detected combination of factors; performs correlation analysis between the selected factors; and performs trend analysis on the selected factors.

22 Claims, 19 Drawing Sheets

*FIG.11*

```
SETUP                                                              ☒
┌─────────────────────────────────────────────────────────────────┐
│                        SIGMADISCOVER                            │
│                MULTI-DIMENSIONAL FAILURE ANALYSIS               │
│                                                                 │
│  1. SELECT DIMENSIONS FROM THE LIST, OR LOAD FROM FAVORITE      │
│     LIST TO BE INCLUDED IN THE ANALYSIS:                        │
│                                                                 │
│   [SELECT ALL]  [REMOVE ALL]    LOAD A FAVORITE: [        ▼]    │
│                                                                 │
│   ┌───────────────────────────────────────────────────────┐     │
│   │ ☐PRODUCT         ☐VERSION       ☐ADDITIONAL PRODUCT CODE │  │
│   │ ☐STATION         ☐DEBUG         ☐SOFTWARE VERSION      │    │
│   │ ☐TEST            ☐FIXTURE       ☐MANUFACTURING LOCATION│    │
│   │ ☐ASSEMBLY LINE   ☐SLOT          ☐SUBTEST               │    │
│   │ ☐OPERATOR        ☐SYMPTOM CODE  ☐MEASUREMENT           │    │
│   └───────────────────────────────────────────────────────┘     │
│                                    [CUSTOMIZE...] [SAVE FAVORITE]│
│                                                                 │
│  2. SELECT THE TIME FRAME FOR THE ANALYSIS:                     │
│                                                                 │
│  UPLOAD DATA FROM [FRIDAY , JULY 03,2009 ▼] (ON OR AFTER 6/25/2009)│
│               TO  [FRIDAY , JULY 03,2009 ▼] (ON OR BEFORE 7/3/2009)│
│         BASED ON  [TEST DATE              ▼]                    │
│                                                                 │
│  3. SET THE FOLLOWING OPTIONS TO ADJUST THE REQUIRED COMPUTATION│
│     ON YOUR MACHINE:                                            │
│                                                                 │
│  TREND ANALYSIS:         ●ON ○OFF    [DAILY              ▼]     │
│                                                                 │
│  OUTCOME DETAILS:        ○ON ●OFF                               │
│                                                                 │
│  PARAMETRIC DATA COMPRESSION: ○ON ●OFF                          │
│                                                                 │
│  SHOW TOOLS                                    [    NEXT    ]   │
│                                                                 │
│                                                SIGMA QUEST      │
└─────────────────────────────────────────────────────────────────┘
```

FIG. 12

○ FACTOR(DIMENSION)
○ ITEM

SIGMADISCOVER 0.9.5
FILE VIEW TOOLS HELP
DATA UPLOADED FOR 06/8/2006 TO 08/12/2006                SIGMAQUEST

RESET ALL FILTERS

| PRODUCT | | NUMBER OF TESTS: 91044 | FILTER |
|---|---|---|---|
| NUMBER OF ITEMS: 16 | | NUMBER OF FAILS: 2129 | RESET |
| ID | NAME | %VOL | FAIL RATE | %F/TF |

| ID | NAME | %VOL | FAIL RATE | %F/TF |
|---|---|---|---|---|
| 10... | DEFAULT>800-0121-001 | 2.13 | 2.63 | 2.40 |
| 10... | DEFAULT>800-0117-002 | 8.37 | 3.56 | 12.73 |
| 10... | DEFAULT>800-0116-002 | 6.64 | 2.99 | 21.28 |
| 10... | DEFAULT>800-0115-002 | 23.37 | 1.11 | 11.09 |
| 10... | DEFAULT>800-0118-002 | 5.54 | 2.71 | 18.04 |
| 10... | DEFAULT>800-0122-001 | 25.39 | 1.63 | 17.71 |
| 10... | DEFAULT>800-0117-006 | 0.63 | 30.66 | 8.27 |

STATION — NUMBER OF TESTS: 91044 FILTER
NUMBER OF ITEMS: 2 — NUMBER OF FAILS: 2129 RESET

| ID | NAME | %VOL | FAIL RATE | %F/TF |
|---|---|---|---|---|
| 10... | TXRACK | 43.55 | 2.85 | 53.17 |
| 10... | 40V2H41 | 56.45 | 1.94 | 46.83 |

TEST — NUMBER OF TESTS: 91044 FILTER
NUMBER OF ITEMS: 3 — NUMBER OF FAILS: 2129 RESET

| ID | NAME | %VOL | FAIL RATE | %F/TF |
|---|---|---|---|---|
| 10... | BER TEST | 49.86 | 1.44 | 30.72 |
| 10... | DLM TEST | 49.16 | 3.28 | 68.86 |
| 10... | DIAGNOSTIC TEST | 0.99 | 1.00 | 0.42 |

ASSEMBLY LINE — NUMBER OF TESTS: 91044 FILTER
NUMBER OF ITEMS: 1 — NUMBER OF FAILS: 2129 RESET

| ID | NAME | %VOL | FAIL RATE | %F/TF |
|---|---|---|---|---|
| 10... | SUNNYVALE>BUILDING 1>LEG.. | 100.00 | 2.34 | 100.00 |

OPERATOR — NUMBER OF TESTS: 91044 FILTER
NUMBER OF ITEMS: 1 — NUMBER OF FAILS: 2129 RESET

| ID | NAME | %VOL | FAIL RATE | %F/TF |
|---|---|---|---|---|
| 10... | LABEUSER | 100.00 | 2.34 | 100.00 |

VERSION — NUMBER OF TESTS: 91044 FILTER
NUMBER OF ITEMS: 1 — NUMBER OF FAILS: 2129 RESET

| ID | NAME | %VOL | FAIL RATE | %F/TF |
|---|---|---|---|---|
| 10... | NOT REPORTED | 100.00 | 2.34 | 100.00 |

DEBUG MODE — NUMBER OF TESTS: 91044 FILTER
NUMBER OF ITEMS: 1 — NUMBER OF FAILS: 2129 RESET

| ID | NAME | %VOL | FAIL RATE | %F/TF |
|---|---|---|---|---|
| P | P | 100.00 | 2.34 | 100.00 |

PRODUCT — NUMBER OF TESTS: 91044 FILTER
NUMBER OF ITEMS: 8 — NUMBER OF FAILS: 2129 RESET

| ID | NAME | %VOL | FAIL RATE | %F/TF |
|---|---|---|---|---|
| 10... | BERTEST | 3.27 | 34.71 | 48.52 |
| 10... | OK | 86.69 | 0.00 | 0.00 |
| 10... | AUTODISC | 1.19 | 24.38 | 12.45 |
| 10... | EQPTERR | 5.08 | 1.49 | 3.24 |
| 10... | DIAGTEST | 1.08 | 0.51 | 0.23 |
| 11... | DLMPARAM | 1.71 | 36.29 | 26.54 |
| 11... | BOOTTEST | 0.28 | 0.00 | 0.00 |

SYSTEM AND METHOD FOR SUPPLY CHAIN DATA MINING AND ANALYSIS

CROSS-REFERENCE TO RELATED APPLICATION

This patent application claims the benefit of the filing date of U.S. Provisional Patent Application Ser. No. 61/105,255, filed Oct. 14, 2008 and entitled "System And Method For Manufacturing Data Mining And Analysis", the entire content of which is hereby expressly incorporated by reference.

FIELD OF THE INVENTION

This invention relates to the general area of manufacturing data mining, and more specifically to a system and method for supply chain data mining and analysis.

BACKGROUND

Data collected in three phases of product design (genealogy data), manufacturing (test and repair data), and customer feedback (product return and maintenance data) need to be jointly analyzed to detect problems and causing factors, find solutions based on historical data, and predict the performance of the system upon any changes in the involving factors. Such analysis leads towards improving time, cost, and quality of the tasks performed in each of the above phases.

Currently, test engineers, production planners, and maintenance engineers perform different levels of analysis on the available data ranging from simple reporting to advanced statistical analysis. The level of analysis depends on the business needs and familiarity of the user with analytics procedures and tools. The following are typical shortcomings of current approaches taken by users:

Since users are limited to reporting tools, they tend to ignore the value of data insights.

The analysis of manufacturing test, return, and product genealogy data is typically performed manually or semi-automatically using, for example, Excel™, Minitab™, or any other similar rudimentary software. Users who value data insights may use various data export tools to download data to their desktop machines and use customized templates available on their desktops to analyze the data by applying filters, sorting, and creating charts. This process is a time consuming process with many deficiencies that does not guarantee to find the problem or suggest a proper solution in a reasonable time.

Sometimes, off-the-shelf Business Intelligence (BI) tools are used to analyze the data. General-purpose BI tools use the various databases that store the desired data and provide features to create data dictionaries, data cubes, various charts, and brows multiple levels of data through well-designed user interfaces. However, directed questions that are specific to a data domain would be impossible or require sophisticated steps that makes the process cumbersome and therefore the users are reluctant to use them.

Therefore, current practices are characterized as time consuming and deficient processes in obtaining deep analytics for test, return and repair, and supply chain analysis.

The vast volume of data collected during test and field study processes requires deep data analysis to find the relations between involving factors, investigate the source of time and cost consuming processes, and study the alternative methods to increase the profit. The invention addresses this issue by demonstrating high speed, accuracy, and usability characteristics.

SUMMARY

In some embodiments, the present invention is a method for supply chain data analysis. The method includes storing supply chain data including test data, genealogy data, repair data, some factors and some items, in one or more databases and selecting a portion of the factors from the stored data, and a time range for analysis. The method then selects one or more criterion for analysis; extracts a portion of the stored data; analyzes the extracted portion of the stored data to detect a combination of factors that result in a test failure, according to the selected factors, the time range, and the selected one or more criterion. The method then detects a root cause for the detected combination of factors; performs correlation analysis between the selected factors; and performs trend analysis on the selected factors.

The method may optionally perform an entropy-based function that shows the variations between items for each selected factor; finds promising configurations and range of test parameters to maximize a yield; performs genealogy analysis by breaking down a product to its components in a parent-child structure; creates production plans based on a required number of units to be tested in a period of time, test time, and failure rate; extracting test data, return and maintenance data, and supplier data, from the stored data, extracts data insights from the stored data collected from test, return and repair, and supply chain processes; and/or performs what-if analysis on the selected factors according to the detected combination of factors.

In some embodiments, the present invention is a system for supply chain data analysis. The system includes one or more databases for storing supply chain data including test data, genealogy data, a plurality of factors and a plurality of items; an input device for selecting a portion of the plurality of factors from the stored data, and a time range for analysis, and selecting one or more criterion for analysis; an extract & calculate module electrically coupled to the one or more databases for extracting a portion of the stored data; and a multi-dimensional failure analysis module for analyzing the extracted portion of the stored data to detect a combination of factors that result in a test failure, according to the selected factors, the time range and the selected one or more criterion, detecting a root cause for the detected combination of factors, performing correlation analysis between the selected factors, and performing trend analysis on the selected factors.

BRIEF DESCRIPTION OF THE DRAWINGS

FIG. 11 shows an exemplary first step in multi-dimensional failure analysis process, according to some embodiments of the present invention.

FIG. 12 illustrates an exemplary user interface, according to some embodiments of the present invention.

DETAILED DESCRIPTION

In some embodiments, the present invention is a data mining and analysis tool and method that provide users with data insights related to testing, repair and return, production, and supply chain. The invention provides an on-demand suite of solutions that help companies build better products using business intelligence techniques for product design, manufacturing, supplier quality, repair and returns resulting in improved product quality, lower costs of goods sold, and increased revenue and profits. The invention includes several features that apply multiple levels of data mining to various data sources.

Figure 1:
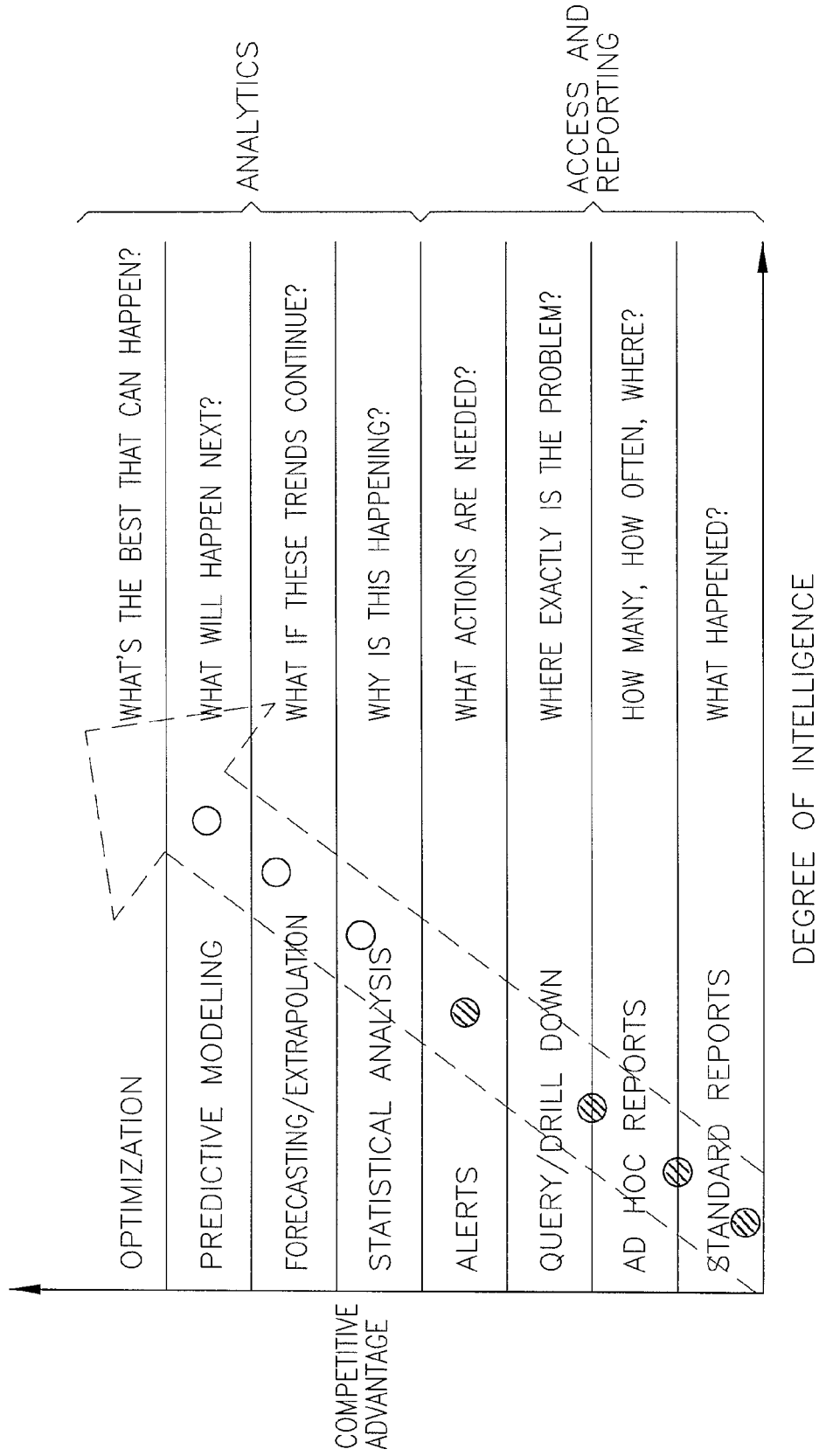
FIG. 1 depicts some exemplary advantages of adding intelligent data analysis methods to raw data, according to some embodiments of the present invention.

Some exemplary advantages of adding intelligent data analysis methods, for example, data mining (DM) technologies, to raw data are demonstrated in FIG. 1. As shown, a low level of value is extracted from data when no intelligent analysis is applied, such as using data for creating simple reports. On the other hand, data would be more valuable when high levels of intelligent analysis are applied to the data, such as making predictions and optimizing processes based on the data.

Unlike finance, marketing, and health care industries, implementation of DM is limited in manufacturing and product quality improvement because of multi-dimensionality of the manufacturing data.

The present invention, overcomes the problem of high dimensional data processing by defining comprehensive data file structure, which allows combining multiple data sources, and fast analysis of high dimensional data. Data here represents physical data, such as data about items being tested, the physical test stations (including test results), repair stations (including the repairs performed on the item), and the like. The physical data is then transformed to more intuitive data such as, visual and statistical data to represent and visualize the transformed physical data.

As used through out this document, a "factor" or "dimension" is a parameter that is involved in the data analysis. For example, main factors in manufacturing data may include product, product category, product version, test, subtest, measurement, station, station type, operator, assembly line, site, building, software version, hardware version, component, join, board version, fail category, error message, and the like. Main factors in genealogy data include component parent and its supplier, component child and its supplier, and the like. Main factors in repair data include fail code, defect code, repair type, component, and the location of the component on the product. Main factors in supplier data comprise supplier, part, lot name, lot size, and the like. Main factors in return and maintenance (RMA) include customer, site, product, call reason, operator, defect code, severity, failed component and its location, and the like. The list of factors is typically defined based on the data and parameters that are collected in transactional databases.

Each factor includes one or more "items," for example, Product factor may include items such as Product A, Product B, Product C, and the like. FIG. 12 shows some examples of factors and items discussed above. A "combination" includes one or more items. For example, Product A, Product A-Test B, Test A-Station B-Fixture C, and the like. Combinations are the building blocks of the present invention. "Problems" are defined based on the combinations, for example, what combinations create most failure, cost, or time. "Solutions" are defined based on combinations too, for example, what combinations should be used or replaced to improve the manufacturing yield, save time and/or save cost.

Figure 2:
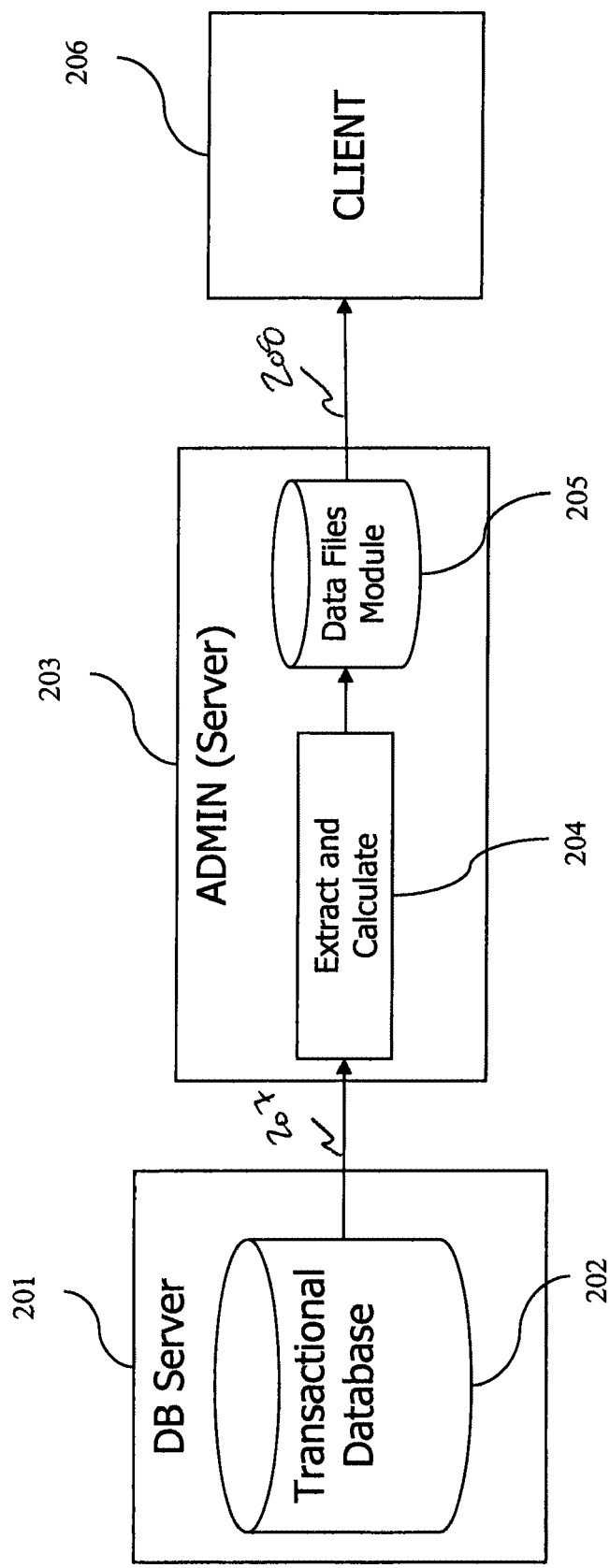
FIG. 2 shows a simplified block diagram of an exemplary system, according to some embodiments of the present invention.

FIG. 2 shows a simplified block diagram of an exemplary system, according to some embodiments of the present invention. As shown, a database server 201 includes one or more transactional databases 202. Transactional databases 202 are optimally designed to efficiently store high volume of data generated on daily bases. The transactional databases 202 store manufacturing, repair, genealogy, and return and maintenance data. Admin server 203 includes an Extract & Calculate module 204 that electrically couples to the databases, performs data calculations, and creates files that are used by a client terminal or module (e.g., a computer or PDA) 206. Data files are stored in a datafiles module 205. The client module 206 provides a user interface to request a variety of data and data analysis, and receive and display a variety of reports. Client module 206 also provides the user with the features such as multi-dimensional failure analysis, test configuration analysis, and intelligent production planning, and tools such as filters, sort, and chart to analyze the data. Database server 201 is electrically coupled to the Admin server 203 via the Internet, a wireless network, a Local Area Network, a Wide Area Network, Ethernet, or any other computer network 207. Similarly, client module (terminal) 206 is electrically coupled to the Admin server 203 via the Internet, a wireless network, a Local Area Network, a Wide Area Network, Ethernet, or any other computer network 208.

Figure 3:
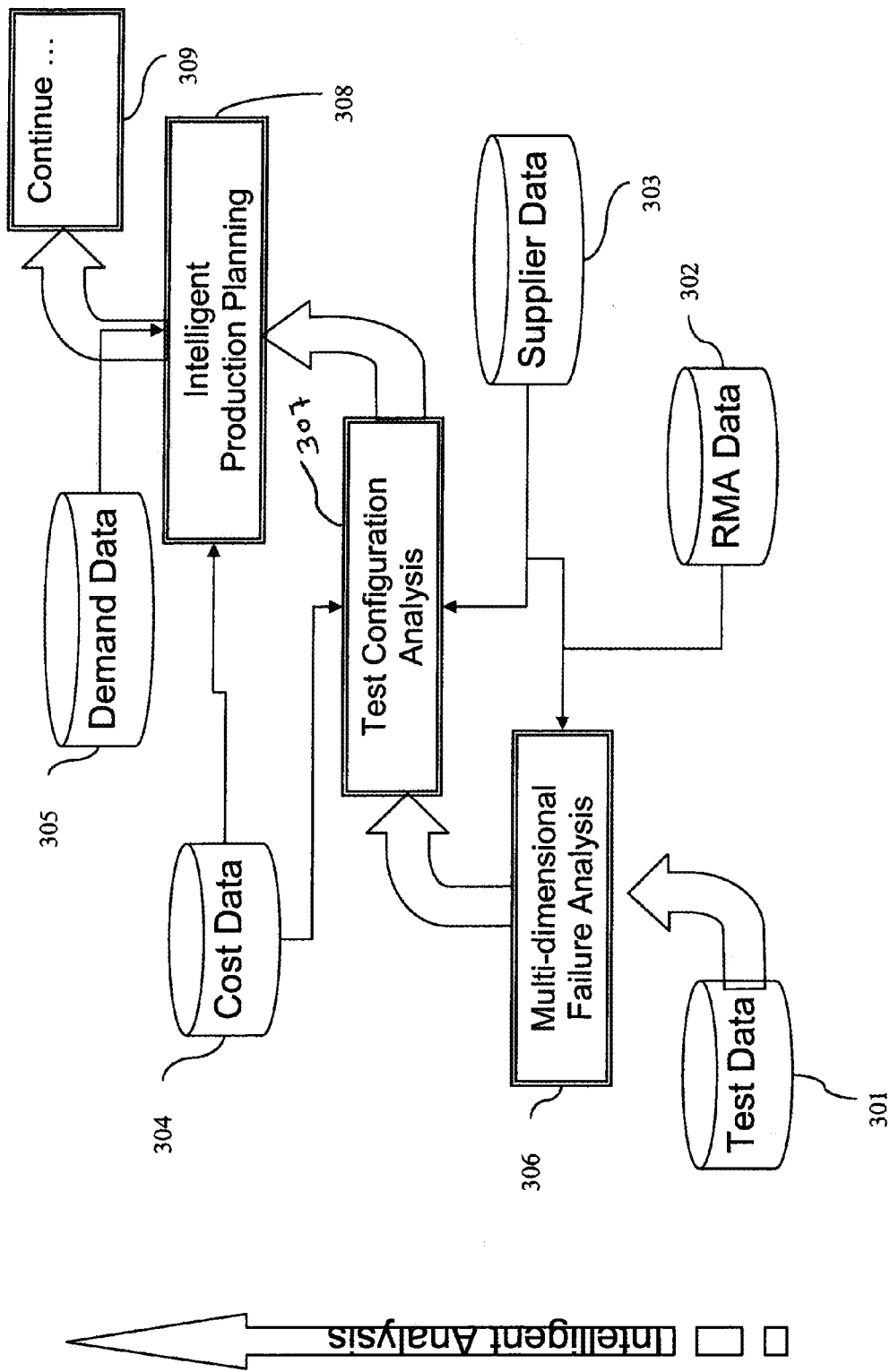
FIG. 3 depicts a more detailed block diagram of an exemplary system, according to some embodiments of the present invention.

FIG. 3 depicts a more detailed block diagram of an exemplary system, according to some embodiments of the present invention. A multi-dimensional failure analysis module 306, as part of one or more computers, detects the primary factors, such as station, test, or operator that result in failures, by accessing test data 301. This module also includes parametric data to investigate the source of the failure, and study the relations between test history and field performance of the produced devices. The multi-dimensional failure analysis module 301 is capable of performing auto discovery, variation indicator, root-cause analysis, and genealogy analysis.

The invention searches for combinations that fit to the criteria set by the user. Variation indicator is an entropy-based function that shows the variations between items for each factor. Root-cause analysis brakes down a test measurement based on related factors and items. Genealogy analysis provides more insight to Product factor by breaking down a product to its components in a parent-child structure.

A test configuration analysis module 307, as part of one or more computers, browses historical data, for example, historical data generated by admin server 203, and finds the promising configurations and range of test parameters to maximize the yield. An intelligent production planning module 308, as part of one or more computers, creates automatic production plans based on the required number of units to be tested in a period of time, test time, and failure rate. Test data, RMA data, and supplier data, are extracted from transactional databases using Extract and Calculate module 204 (see, e.g., FIG. 6). Cost data, and demand data are provided by the user for each factor.

In some embodiments, the method and system of the present invention extracts data insights from raw data collected from test, return and repair, and supply chain processes. It summarizes (see, e.g., FIG. 6) raw data available in transactional databases into new data files (see, e.g., Table 1) for detailed analytics purposes. The data structure utilized in the summarized data files facilitates fast access to valuable information to identify problems, discover source of the problems, and make intelligent decisions to reduce the cost. The invention is capable of connecting to various other tools to pull out detailed data such as individual unit numbers.

In some embodiments, the multi-dimensional failure analysis module 306 of the present invention identifies a problem (nugget) for example, a faulty combination that includes one or more nuggets, discovers the root cause for each nugget, observe how yield and measurement change based on each dimension, performs correlation analysis between dimensions and performs trend analysis. The above capabilities help users locate combinations of factors (station, fixture, operator, etc.) that result in failure and answer users' questions such as:

What are the primary factors that create most of the failures?

How can we save time and reduce cost by omitting unnecessary tests?

How can we change the test limits to achieve higher yield?

What is the expected return pattern for devices with a particular test history?

In some embodiments, the test configuration analysis module 307 performs "what-if" analysis on test, return and repair, and supplier data. The inputs for this module are the volume and failure rate of each combination, which is provided by the multi-dimensional failure analysis module 306. In some embodiments, the test configuration analysis module includes a manual mode and an automatic mode. In the manual mode, the user enters a substitute configuration into the module. A configuration is a combination of factors (dimensions) used in a design or test. For example, test T of a product with genealogy G, performed on station S, using fixture F, operator O, and test limits L is a combination. The module then outputs a percentage change in yield for the given substitution. In the automatic mode, the user selects a set of factors and enters a desired yield improvement percentage. The module then searches different combinations in the selected dimensions and returns the best one(s) that achieve(s) the desired level of yield improvement.

As another example, the test configuration analysis module 307 may perform marginal (pass and fail) analysis. This feature discovers measurements that have significant marginally passed or failed tests. Then, the module predicts how any changes in the limits (upper limit, lower limit, or both) will affect the yield. The module then recommends new limits if the yield on a specific measurement is required to be increased to a specific level defined by the user.

In some embodiments, the test configuration analysis module 307 traces the effect of a change on other elements, and suggests alternatives for a desired change. The inputs of this module are the confidence intervals and variability ranges, which are provided by what-if analysis in test configuration analysis module. This module answers user questions such as:

How the yield changes if a certain configuration is substituted by another one?

To improve the yield, which configurations should be substituted?

How does the return pattern change, if a specific test is modified?

In some embodiments, the intelligent production planning module 308 automatically allocates resources, such as, stations, fixtures, operators and the like. The module takes one or more desired functions selected by the user such as, minimize cost, minimize scrap, minimize time-in-process, maximize resource utilization, and the like, and outputs best one or more configurations that meet the selected desired functions. For example, the module may output a best configuration for testing product P on a specific station S, using particular fixture F to maximize "station utilization."

In some embodiments, the module creates automatic production plans based on the available resources such as time, stations, operators, etc. For example, each item in the factors selected by the user is considered a resource and its limitation can be set by the user in terms of number, time, or cost. The intelligent production planning module 308 provides solutions to typical problems such as: How should the resources be allocated if x units of A, y units of B and z units of C are needed to be manufactured by the end of the week?

Figure 4A:
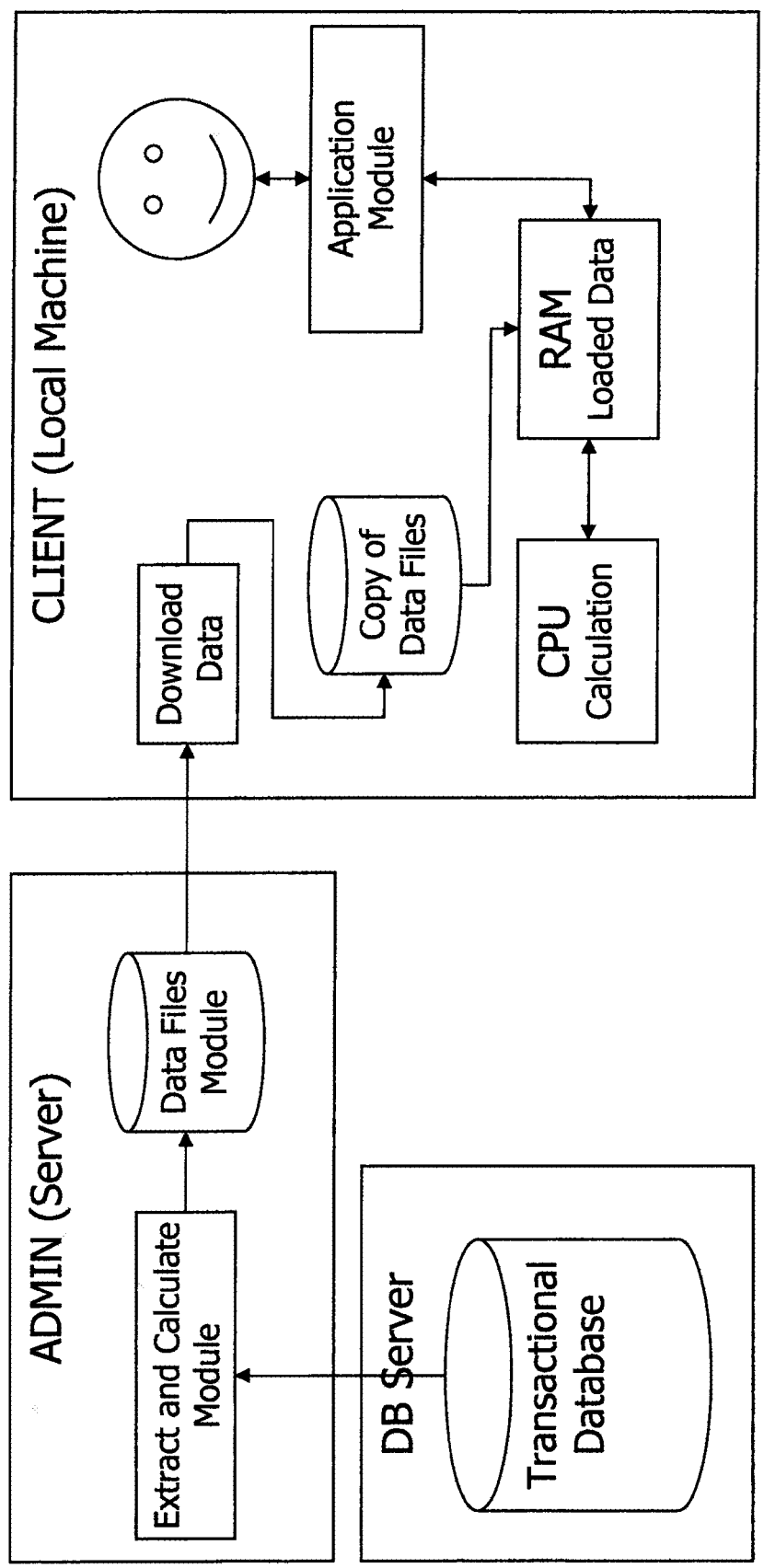
FIG. 4A shows a desktop application configuration, according to some embodiments of the present invention.
Figure 4B:
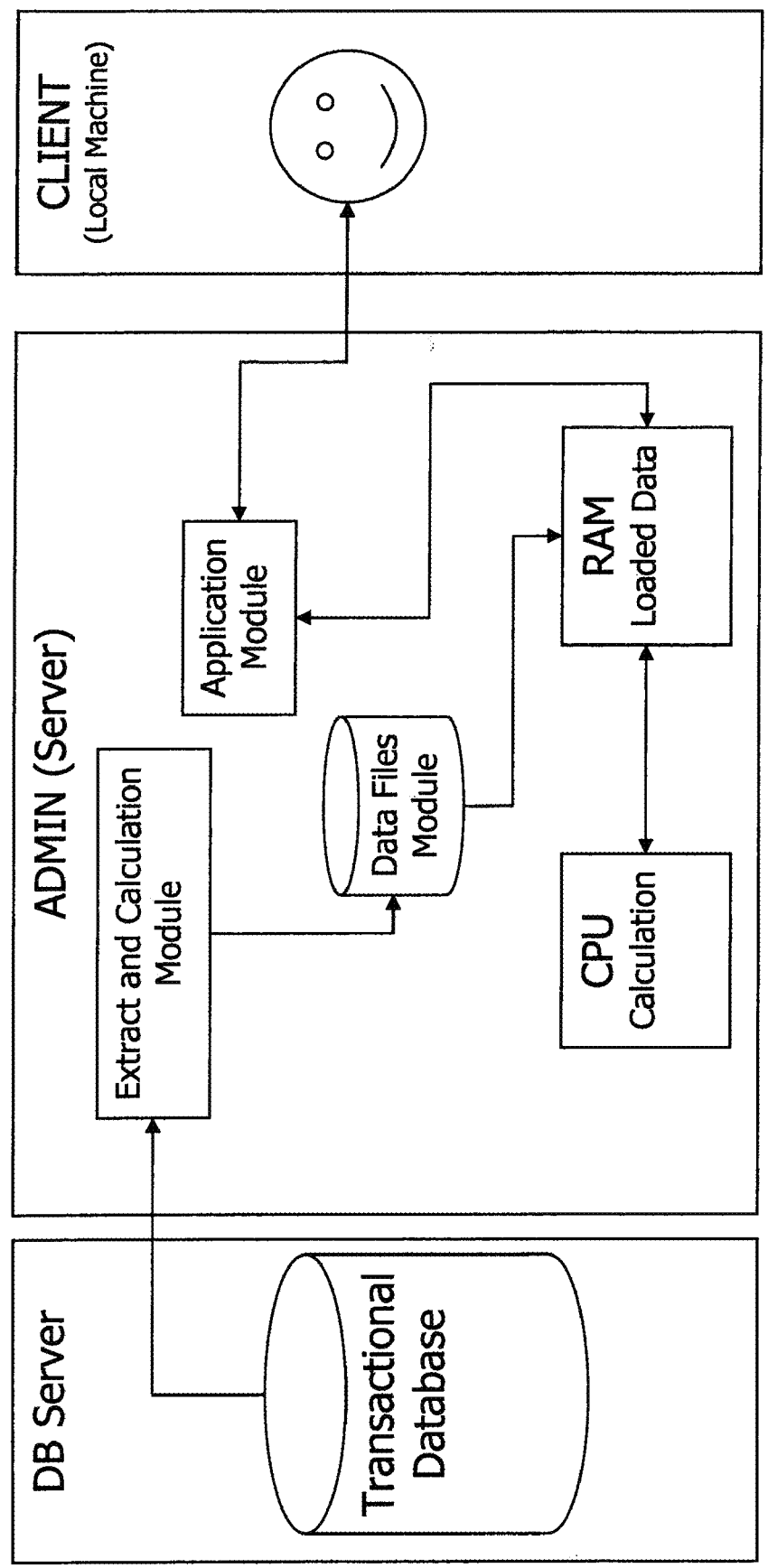
FIG. 4B shows a Software as a Service (SaaS) configuration, according to some embodiments of the present invention.

The present invention can be configured as desktop application, as shown in FIG. 4A, or as a web-based application, that is, Software as a Service (SaaS), as shown in FIG. 4B. In both cases, a server is included in the admin side to extract data and create data files. In desktop configuration of FIG. 4A, the application (module) is installed on the client (local) machine, connects to the Admin server to download a copy of data files to the client machine, and uses client machine resources (CPU and RAM) when running. On the other hand, in SaaS configuration, user utilizes a web-based user interface to use the application (module) which is running on the server and consuming server's resources.

Figure 5:
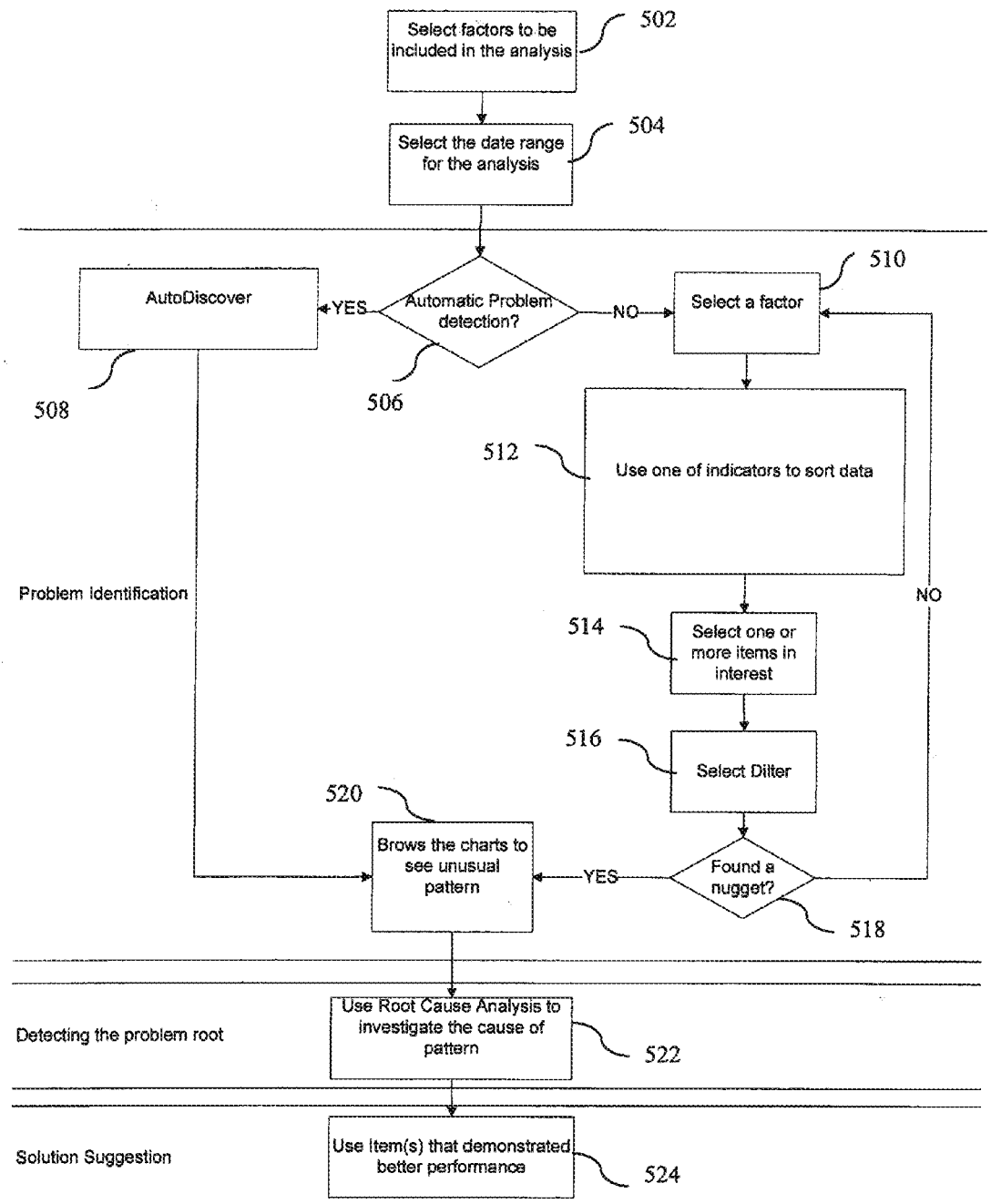
FIG. 5 is an exemplary process flow for identifying a problem, detecting the root of the problem, and suggesting a solution, according to some embodiments of the present invention.

FIG. 5 is an exemplary process flow for identifying a problem, detecting the root of the problem, and suggesting a solution, according to some embodiments of the present invention. FIGS. 11-16 illustrate some exemplary user interfaces associated with each step, according to some embodiments of the present invention.

First the user is asked to select a set of factors, and specify a time range of data to be included in the analysis (blocks 502 and 504) via an input device. An exemplary UI for selecting these factors and the data range is shown in FIG. 11. In some embodiments, the user can select two modes to identify problems: Manual or Automatic mode.

In Manual mode (blocks 510 and 518), Multi-dimensional Failure Analysis interface (See for example, FIG. 12 and FIG. 14) are used to display the categorized data, associated with KPI's (Key Performance Indexes). This interface includes sort and filter features and provides the user with the required tools to identify the faulty combinations of factors.

Typically, there are two approaches to benefit from Multi-dimensional Failure Analysis: Up-down approach and Bottom-up approach. In Up-down approach (typically more usable to management), the user starts with high-level factors (for example, Product, Station, Test, Customer, Supplier, etc.) to identify the problem (See, e.g., FIG. 12) and then continues to lower level factors (for example, Measurements, repaired components, failure codes to find the source of the problem (See, e.g., FIG. 14 and FIG. 15). In the bottom-up approach (typically more usable to test engineers, designers, and analysts), the user starts with lower level factors (See, e.g., FIG. 14) to identify engineering level problems, and then uses Root-Cause analysis (See, e.g., FIG. 15) or filtering feature to trace the effect of the problem on higher level factors (See, e.g., FIG. 12)

Referring back to FIG. 5, in Automatic mode (block 508), the user relies on the system to return those combinations that fit in the criteria specified by the user. In FIG. 13-A, the user sets minimum failure rate and sample size, and maximum PPK to define the borders of faulty combination. In FIG. 13-B, the user even don't need to specify the thresholds, and simply asks the system to return the top n problems based on the KPI importance weights that the user specifies by dragging the slide bar.

The root of the problems is usually related to the lower level factors such as Measurements. Therefore, there are charting (block 520, illustrated in more detail in FIG. 14) and Root-Cause Analysis (blocks 522-524, illustrated in more detail in FIG. 15) features to discover the abnormal behaviors in parametric data.

Figure 6:
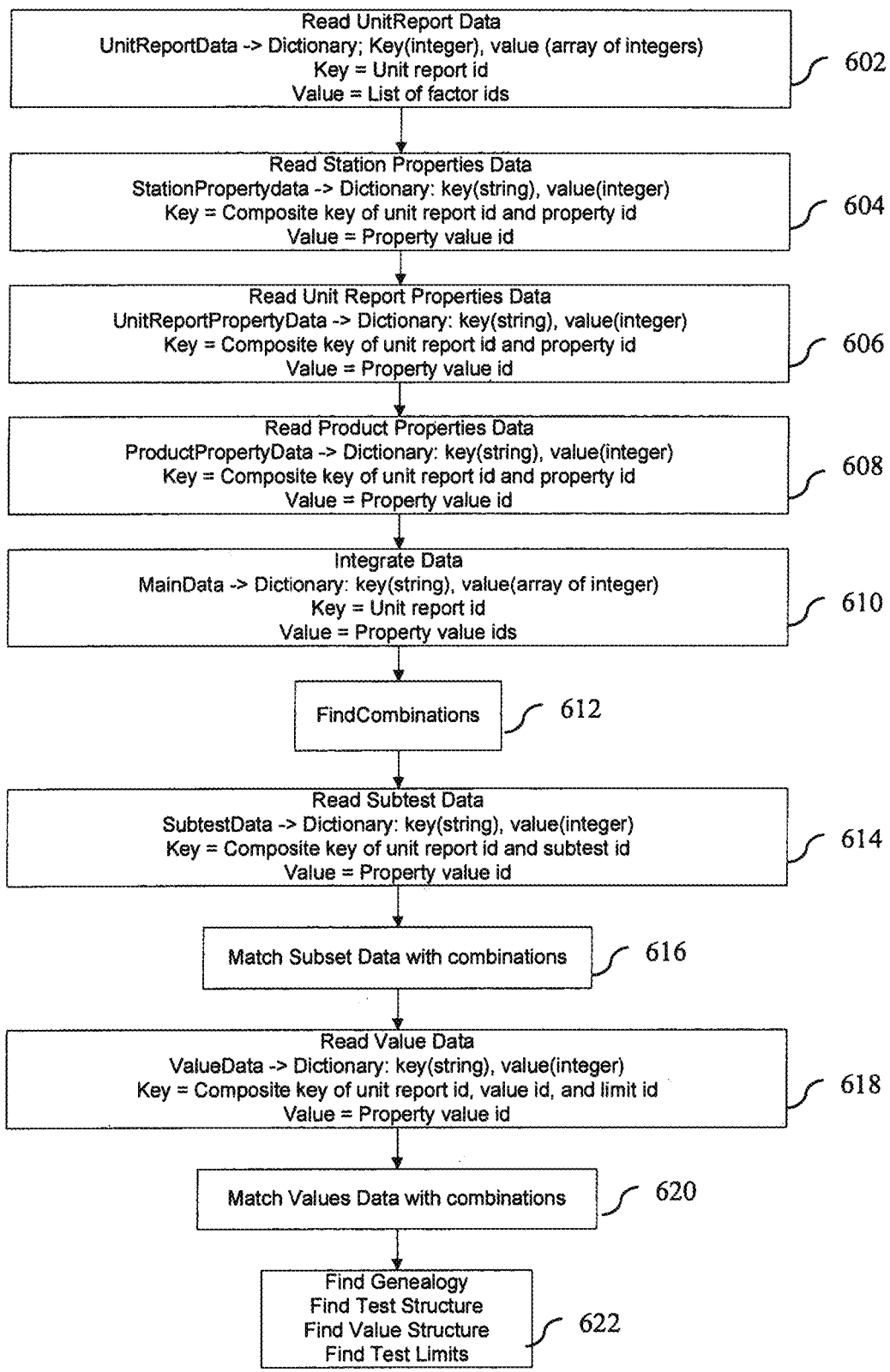
FIG. 6 is an exemplary process flow for extracting data from transactional databases and calculating data cubes, according to some embodiments of the present invention.

FIG. 6 is an exemplary process flow for extracting data from transactional databases and calculating data cubes, according to some embodiments of the present invention. Typically, the output of a test (for example, pass, fail, abort, skip, etc) is defined in three levels: Test, Subtest, and Measurement. Each Test includes multiple Subtests, and each Subtest includes multiple Measurements (values). Test data are distributed among multiple data tables, based on the structure of database, such as Unit Reports, Station Properties, Unit Report Properties, and Product Properties. As shown, Unit Report data, Station Properties data, Unit Report Properties data and Product Properties data are read (blocks 602 to 608) and integrated (block 610) to find different combinations, in block 612. Subtest data is then read (block 614) to be matched with the combinations, in block 616. Value (Measurement) data is then read in block 618 to be matched with the combinations, in block 620. Finally, genealogy data, test structure, value structure and test limits are determined, in block 622.

In some embodiments, genealogy data includes the relations between the components in a product. Test structure presents the relations between test and subtests, value structure data includes the relations between tests and measurement, and test limit data includes Lower Spec Limit (LSL) and Upper Spec Limit (USL) for each measurement. Table 1 shows an exemplary data structure for the present invention, which is the output of this process.

TABLE 1

Figure 7:
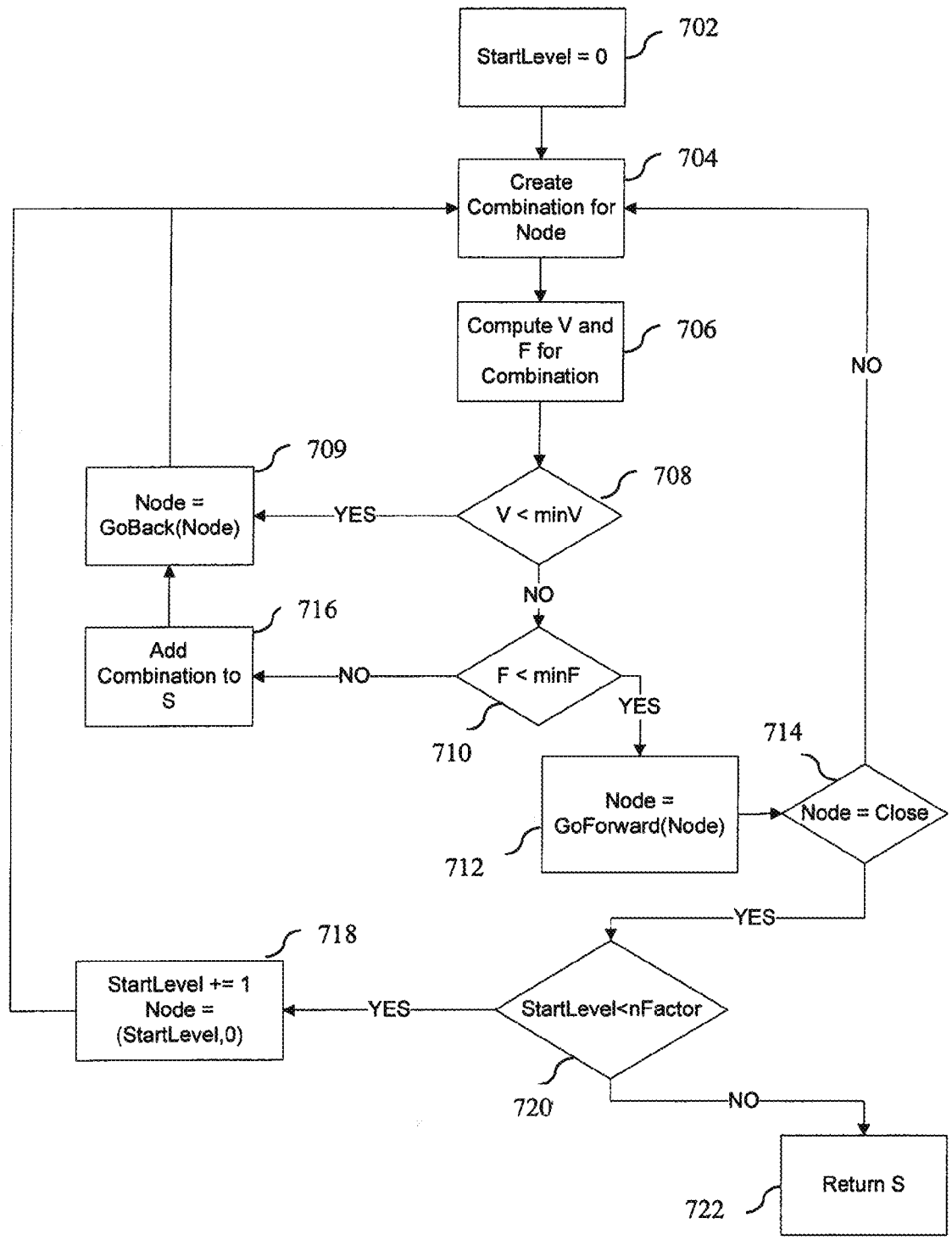
FIG. 7 is an exemplary process flow for identifying the combinations that meet the criteria that is set by the user, according to some embodiments of the present invention.

1. Shared Data
    a. Combinations −> Dictionary: key (integer), value (Array of Integer)
        i. Key = Combination Id
        ii. Value = List of items in the combination
    b. UnitReports −> Dictionary: key (integer), value (Array of Integer)
        i. Key = Combination Id
        ii. Value = List of related unit report ids
    c. TestStructure −> Dictionary: key(integer), value(Array of integer)
        i. Key = Test id
        ii. Value = List of subtests
    d. ValueStructure −> Dictionary: key(integer), value(Array of integer)
        i. Key = Test id
        ii. Value = List of measurements
    e. Genealogy −> Dictionary: key(integer), value(Array of integer)
        i. Key = Composite key of Child id and Supplier id
        ii. Value = List of related combinations
    f. GenealogyStructure −> Dictionary: key(integer), value(Array of integer)
        i. Key = Parent id
        ii. Value = List of Children ids
    g. Names −> Array of (Dictionary: key(integer), value(string))
        i. Array: includes Dictionary for each dimension
        ii. Key: Item id
        iii. Value: Item name
    h. TestLimits −> Dictionary: key(integer), value(Array of double)
        i. Key = Limit id
        ii. Value = lower limit and upper limits
2. Summary Data
    a. Main −> Dictionary: key(integer), value(array of integer)
        i. Key = Combination id
        ii. Value = Number of performed tests in each outcome category
    b. Subtest −> Dictionary: key(string), value(array of integer)
        i. Key = Composite key of Combination id and Subtest id
        ii. Value = Number of performed tests in each outcome category
    c. Value −> Dictionary: key(string), value(array of double)
        i. Key = Composite key of Combination id, Measurement id, and Limit id
        ii. Value = number of tests, sum of test measurements, sum of square of test measurements
3. Detail Data
    a. Value −> Dictionary: key(string), value(array of double)
        i. Key = Composite key of Combination id, Measurement id, and Limit id
        ii. Value = Measurement values in each outcome category FIG. 7 is an exemplary process flow for identifying the combinations that meet the criteria that is set by the user, according to some embodiments of the present invention. nFactor is the number of factors selected by the user in the analysis. MinV is a minimum expected volume and minF is the minimum expected failure rate, input by the user. The output S is a list of combinations that have a percent volume more than minV and failure rate larger than minF. Since computing all possible combinations are time consuming, the process uses a break down method to avoid creating unpromising combinations. At each level of break down, the invention creates combinations, calculates the volume (V) and failure rate (F) of each combination, and compares them with thresholds defined by the user. In some embodiments, there are three scenarios:

1) The current combination meets the user's criteria; thus it is added to the output (blocks 708, 710, and 716)
2) The current combination is unacceptable because the volume of the combination drops below min V thus, there is no point in breaking down current combination. (blocks 708 and 709)
3) The current combination does not meet user's criteria but it may be desirable to break it down further because the volume is high. (blocks 708, 710 and 712)

Figure 8:
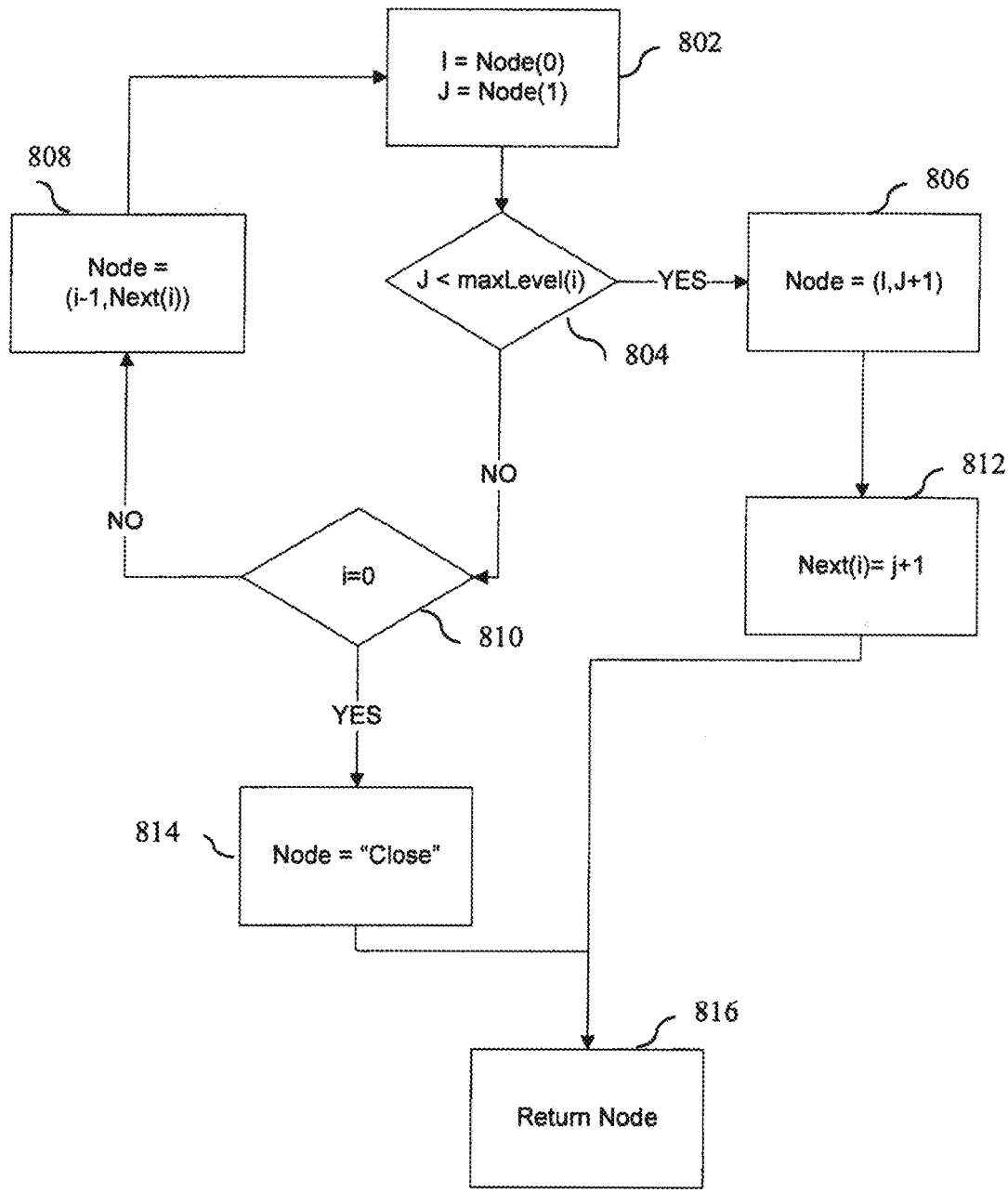
FIG. 8 is an exemplary process flow of a "GoBack" procedure in FIG. 7, according to some embodiments of the present invention.
Figure 9:
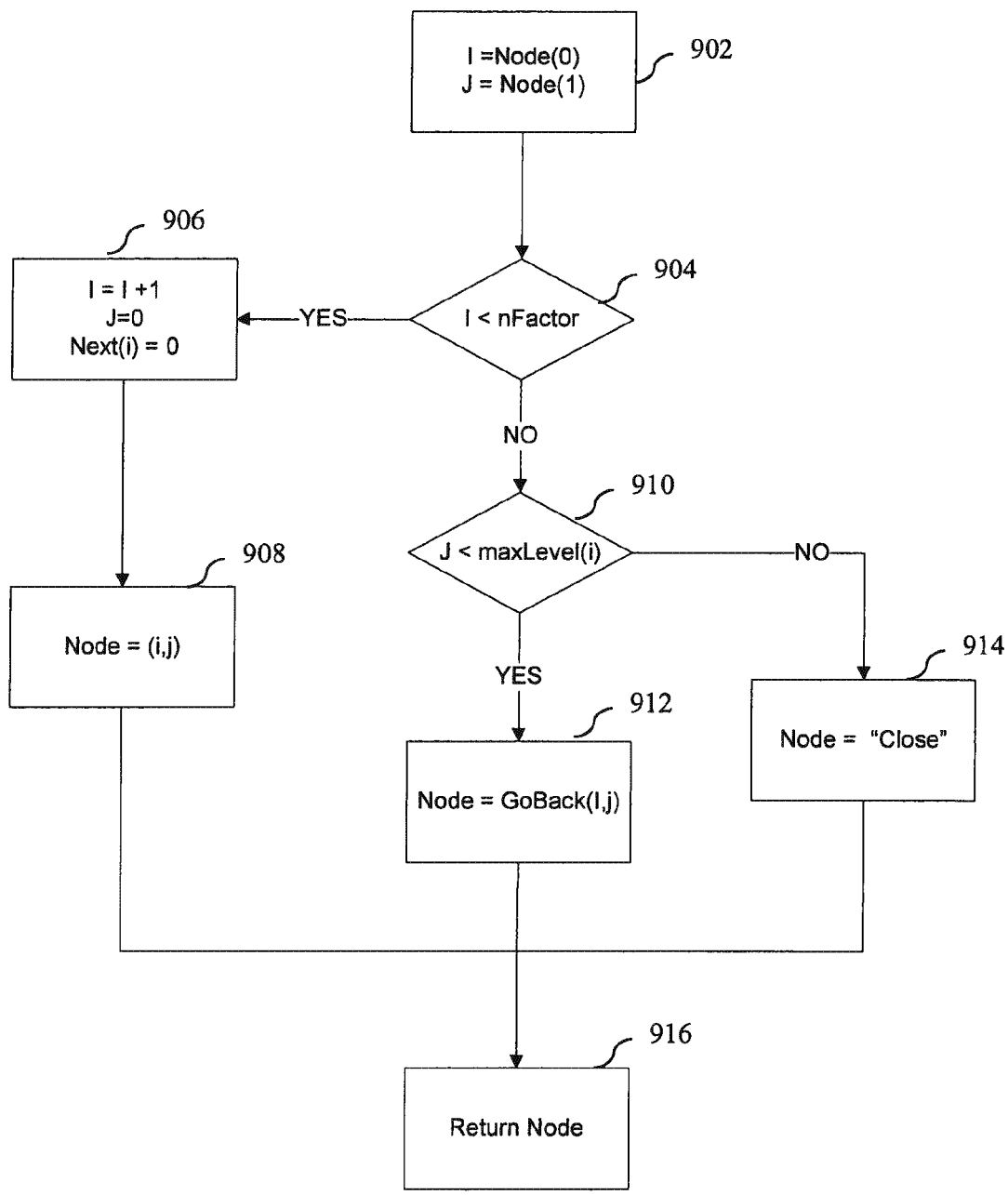
FIG. 9 is an exemplary process flow of "GoForward" procedure in FIG. 7, according to some embodiments of the present invention.

In some embodiments, the process flow has two sub-procedures, GoForward (block 712) and GoBack (block 709) that are depicted in FIGS. 8 and 9, and described in more detail below.

FIG. 8 is an exemplary process flow of a "GoBack" procedure in FIG. 7, according to some embodiments of the present invention. A GoBack procedure returns the updated node based on changing either items or factors in the current combination. If there are items in the current combination that have not been checked, the procedure picks the next item in the list and returns the new node (blocks 804-806-812). If there are no items left, the procedure goes back and returns the next item queued in the previous factor (blocks 804-810-808). If there are no factors left, the procedure returns a "Close" tag to notify that all possible combinations are checked for the current factor (blocks 810-814).

FIG. 9 is an exemplary process flow of "GoForward" method in FIG. 7, according to some embodiments of the present invention. In some embodiments, the invention breaks down the current combination, and returns the updated node. If the number of currently involved factors in the combination is less than the number of all factors (block 904), the invention breaks the current combination by adding another factor (dimension) to the combination and returns it as the output (blocks 906 and 908). If all factors are already involved, the invention updates the break down by replacing new items and returns it as the output (blocks 910 and 912). If there are neither new factors nor new items left, the invention returns "Close" to specify that further break down is not possible.

Figure 10:
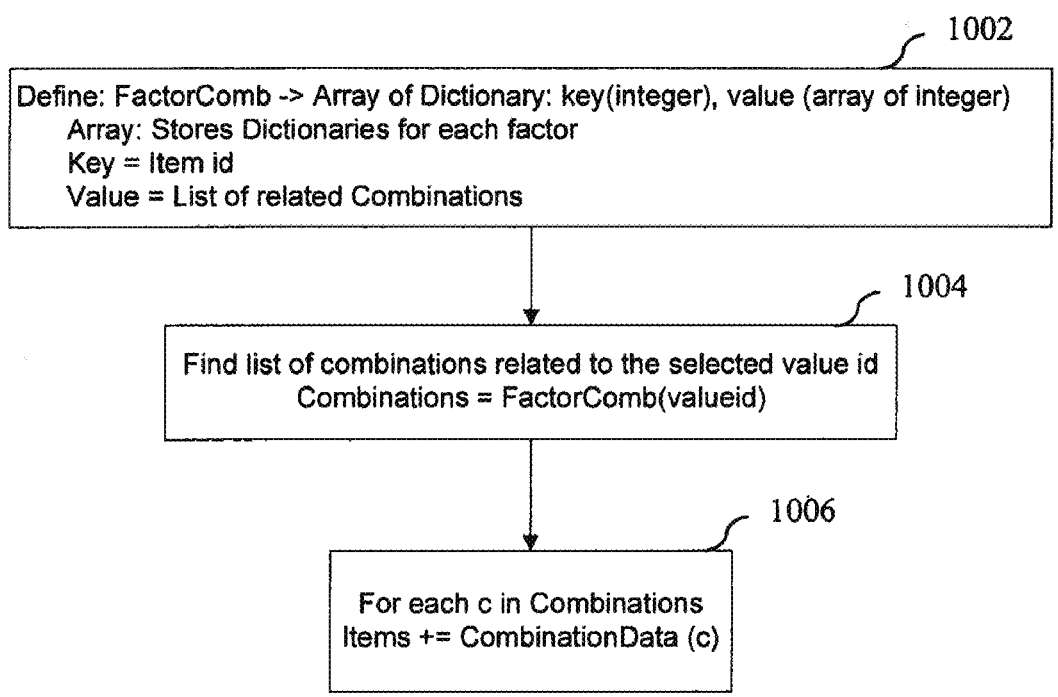
FIG. 10 is an exemplary process flow for root-cause analysis, according to some embodiments of the present invention.

FIG. 10 is an exemplary process flow for root-cause analysis, according to some embodiments of the present invention. This process is used to break down the statistics of a measurement based on the involving factors. For example, the average value of a test is X, but the user is interested to know the average of that test on each station. The process starts by finding the combinations that include the selected test. Then, for each selected combination, the statistics (average, standard deviation, etc.) are updated.

FIGS. 11 to 16 are exemplary user interfaces for various aspects of the present invention, mainly described in FIG. 5. FIG. 11 shows an exemplary first step in multi-dimensional failure analysis process, according to some embodiments of the present invention. The user selects the set of factors to include in the analysis. The user has the option of narrowing down the data by clicking on Customize button to select a set of items for each factor. the time range of the analysis is also selected. Here, there are three options that the user can set to on/off. The first option is related to time trend analysis. If turned on, the user needs to provide the aggregation level: day, week, month, and the like. The next option, if turned on, considers detailed test outcomes such as pass, visual inspected pass, enforced pass, failed, visually inspected fail, enforced fails, aborted, skip, and the like. Otherwise, all the calculations would be based on pass and fail only. The third option compresses parametric data for faster calculation.

FIG. 12 illustrates an exemplary user interface for multi-dimensional failure analysis, according to some embodiments of the present invention. Here, each factor selected by the user in previous step is assigned a box to include the following KPI's (Key Performance Indexes):

Test Factors:
　Number of Items indicates the number of Items for the Factor,
　Number of Tests indicates the number of tests that included the selected item,
　Number of Fails indicates the number of failed tests that included the selected item,
　% vol (percentage of volume) is the number of tests for the selected item divided by total number of test,
　Fail Rate is the number of fails divided by the number of tests for the selected item, and
　% F/TF is the number of fails for the selected item divided by the total number of fails.

Repair Factors:
　Number of Items indicates the number of Items for the Factor,
　Number of Repairs indicates the number of repairs that included the selected item,
　Cost of repair (e.g., cost of component+Labor),
　% vol (percentage of volume) is the number of repairs for the selected item divided by total number of repairs, and
　Average time to Repair indicates the average time required to perform the repair.

RMA Factors:
　Number of Items indicates the number of Items for the Factor,
　Number of Returns indicates the number of returns that included the selected item,
　Cost of return (e.g., cost of component+Labor+Shipment),
　% vol (percentage of volume) is the number of returns for the selected item divided by total number of returns,
　Return Rate is the number of returns divided by number of units shipped for each item, and
　Mean time to return indicates the average time that it takes a product to be return by a customer after shipped out of factory.

Genealogy Factors:
　Number of Items indicates the number of Items for the Factor,
　Cost indicates the cost of the component
　Number of Tests indicates the number of tests that included the selected item,
　Number of Fails indicates the number of failed tests that included the selected item,
　Number of Repairs indicates the number of repairs that included the selected item,
　Number of Returns indicates the number of returns that included the selected item, Return Rate is the number of returns divided by number of units shipped for each item, and Mean time to return indicates the average life time of a component.

Figure 13A:
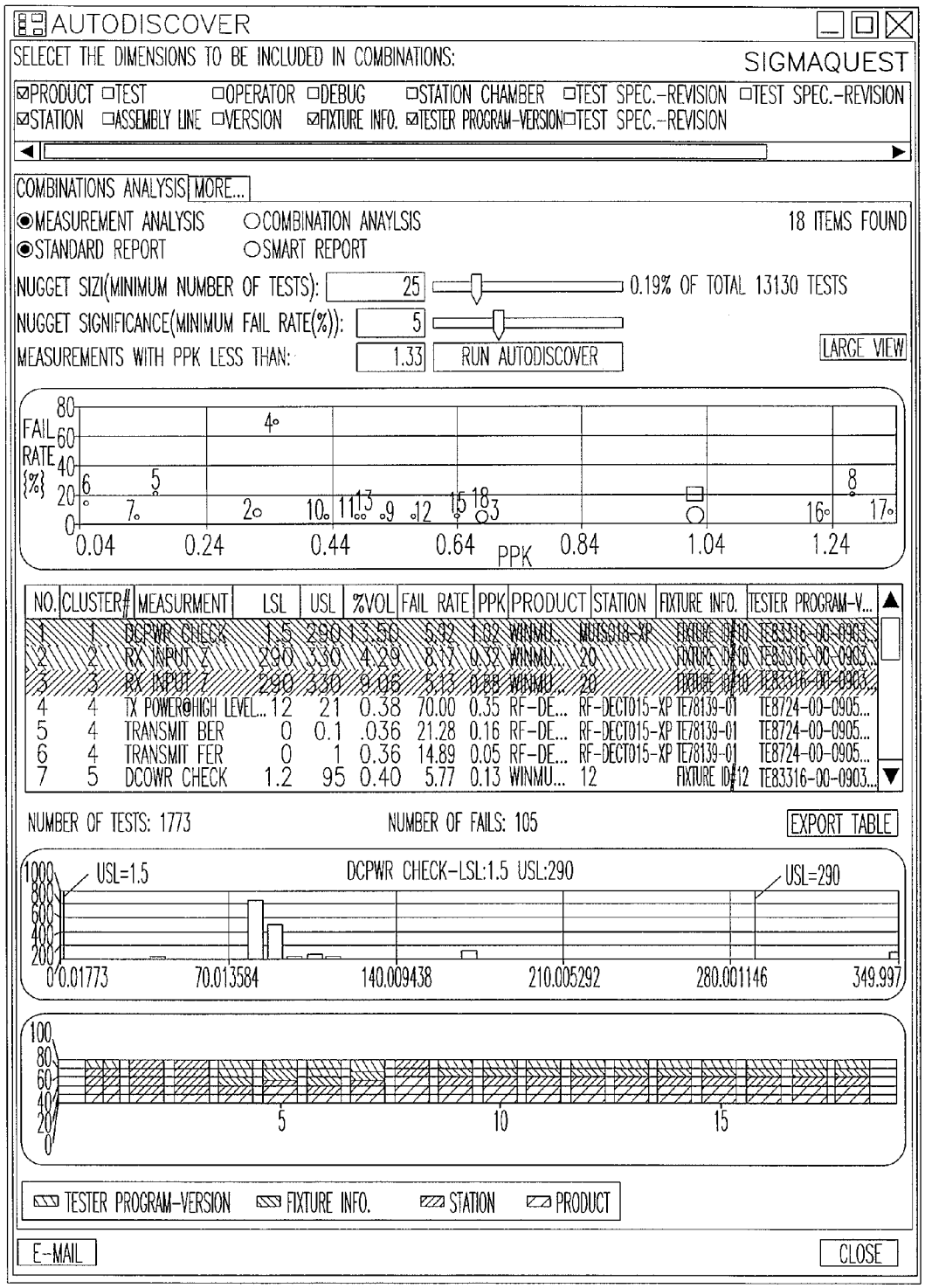
FIGS. 13A and 13B show exemplary user interfaces for interacting with the method and system of the present invention, according to some embodiments of the present invention.
Figure 13B:
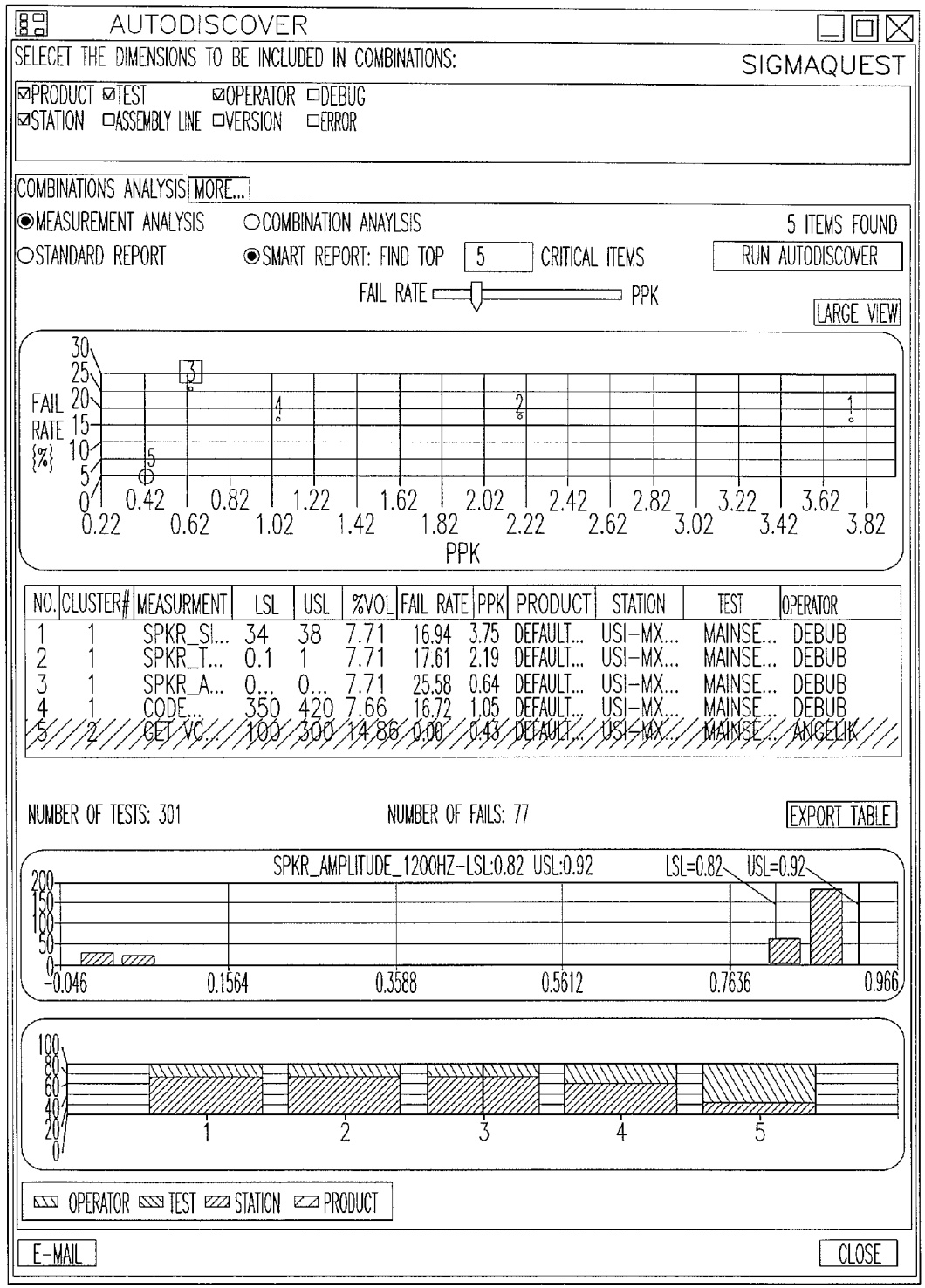

FIGS. 13A and 13B show exemplary user interfaces for interacting with the method and system of the present invention, according to some embodiments of the present invention. In FIG. 13A, the user specifies the thresholds of failure rate, sample size, and PPK to be analyzed by the invention. In FIG. 13B, the software according to the present invention is executed based on the KPI importance weights adjusted by the user through the slide bar.

This facilitates finding data point clusters comprising a large quantity of data points. A cluster is a group of data points that share the same values for one or more selected attributes. In the two dimensional (two attributes) example below, there are three clusters, where there is a cluster for each of where each cluster has measurement data associated with the two specific attribute values. While there be many clusters of more than one data point, we are really only interested in the clusters with many more data points than other clusters and some noticeably higher percentage of all data points. The invention's Cluster Analysis provides the means to set a threshold quantity for the cluster and a threshold percentage. Clusters that meet these conditions are known as nuggets, and only nuggets are displayed on the graph for analysis. This allows us to filter out clusters of lower quantities and percentages.

The Bubble Chart graph in the middle of the page visually shows salient PPK measurement information for each nugget. With this many nuggets, one might consider higher thresholds as a useful filter. The numerical index at the top of each circle refers to the Nugget Number in the Nugget Table list below. The larger the indicator (e.g., circle), the more data is in the nugget. Note that nuggets on the left have the lowest PPKs and nuggets which are high on the chart have the highest failure rates. This directs the user to first investigate nuggets, which are closer to the upper left corner of the Bubble Chart. These are the nuggets with the highest problem criticality.

A nugget table illustrates which nuggets should be investigated first. Since all of the depicted nuggets meet the criteria of very low PPK, they are all subject to investigation. However, the visual depiction of the nuggets assists the user with a priority order. The upper left criticality approach is discussed above. An additional approach for nugget investigation priority is to look at which clusters have the most data (largest circles). This approach recognizes that analyzing a large nugget first means that solving the root cause of its low PPK will affect the largest quantity of issues all at once.

The user (analyst) employs the three graphs and one table to browse and drill down on nugget information. The Analyst can use the first graph and the table below to select individual nuggets. When a nugget is selected, the two charts below (second and third chart) are updated for the nugget selected.

The second chart depicts a histogram for the measurements of the above selected nugget as well as the LSL and USL for the Part being measured. For example, it is shown that for Nugget 1 the data substantially falls to the left of the middle of product measurements specification region. This accounts for a low PPK.

A root cause chart illustrates which of the parameter values in a nugget are responsible for failures. The third and bottom chart tells us. Each vertical colored bar represents the likeliness of how much the dimension affects failures. These visualizations are based on data across all measurements collected, not just the nugget being analyzed. The larger the percentage of the vertical bar that the dimension occupies, the more likely, it is responsible for the failures.

Figure 14:
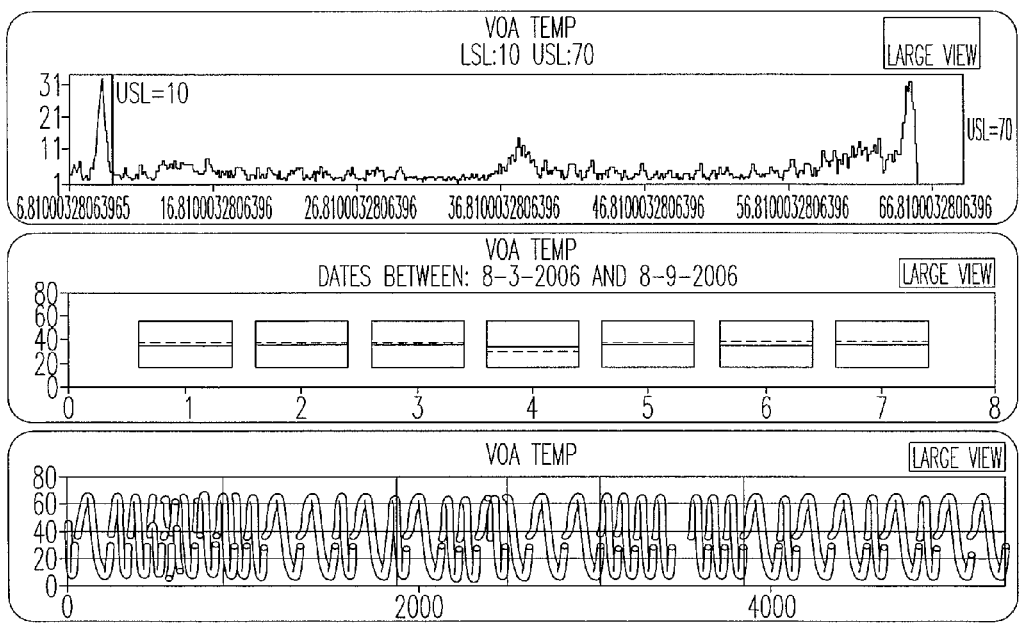
FIG. 14 shows exemplary charts associated with parametric data for a selected measurement, for example, voa temp test, according to some embodiments of the present invention.

FIG. 14 is the bottom part of Multi-dimensional Failure analysis interface of FIG. 12 that shows exemplary charts associated with parametric data for a selected measurement, for example, voa temp test, according to some embodiments of the present invention. Three charts are used to capture the variation from different point of views. The first chart, Measurement Histogram, provides the means to measure the performance (good or bad) of a Part's measurements relative to published required Part specifications. It is a histogram of the measurement values along with the LSL and USL. This chart provides visualization of how well the measurements fall in between the required specifications. In this example, the measurements fall mostly in the middle between the LSL and USL so this is very good. When the histogram is skewed heavily toward the LSL or USL this provides a good understanding of PPK and how to investigate device parameters further. The third chart, Run Chart, shows all of the data as it is allocated over time. This gives a quick sense of the distribution of measurement values over time. It plots every single measurement.

The second chart, a Boxplot Chart, is a quick summary of how measurement values are distributed per day, and change over time. The solid part of a box shows the lower and upper value observed for where 50% of the measurement values fell. The whiskers show the lower and upper value for where 90% of the measurement values fell. Thus, the upper whisker represents that 5% of the values fell above that value while the lower whisker represents that 5% of the values fell below that value.

Figure 15:
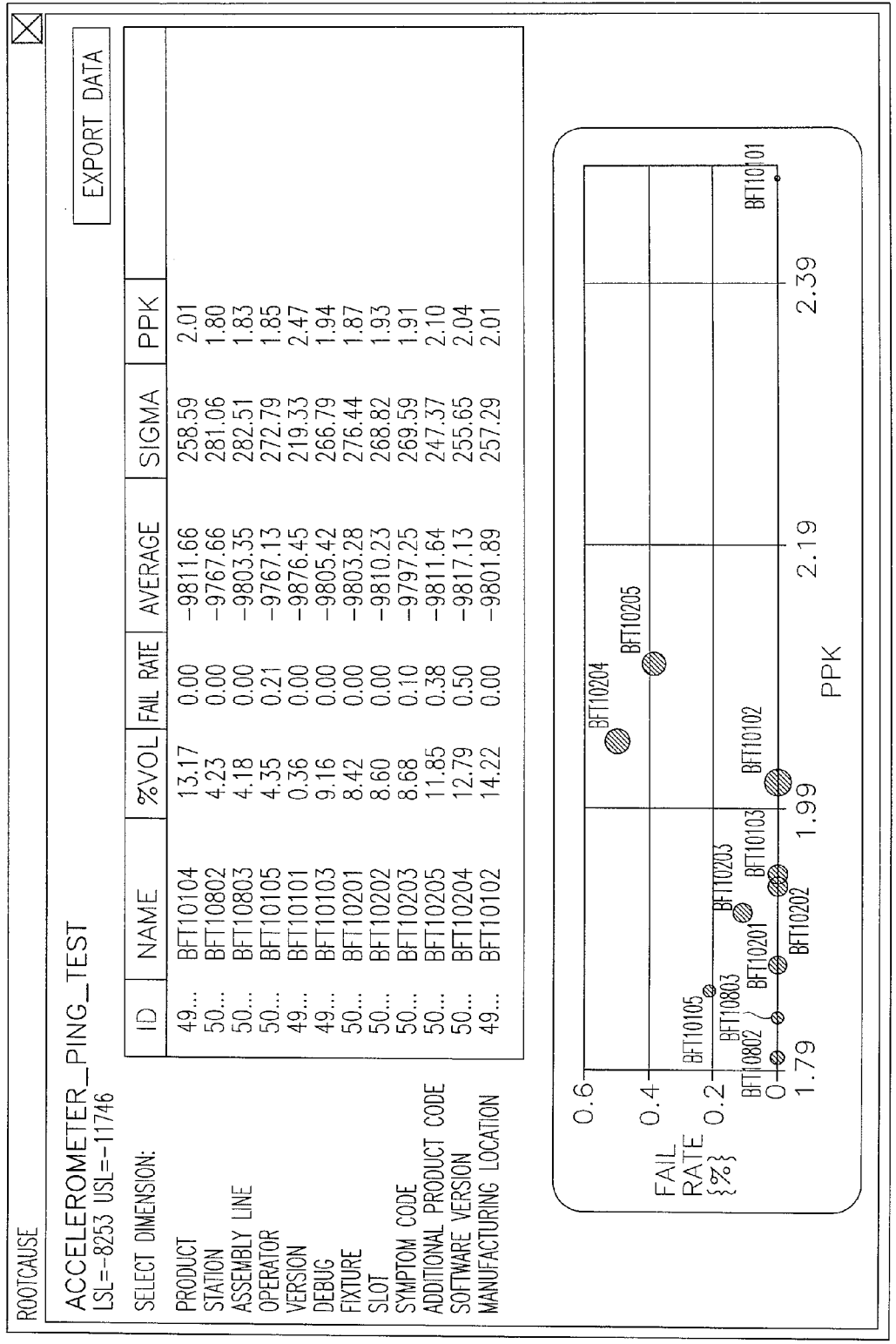
FIG. 15 illustrates the user interface for root-cause analysis, according to some embodiments of the present invention.

FIG. 15 illustrates the user interface for root-cause analysis, according to some embodiments of the present invention. For example, the mean, average, and PPK (a quality control index) for voa temp test are 35.47, 20.36, and 0.42 according to FIG. 14. Using root-cause analysis, the above statistics are broken down based on each factor and item. FIG. 15 shows the break down for items in Product factor.

Figure 16:
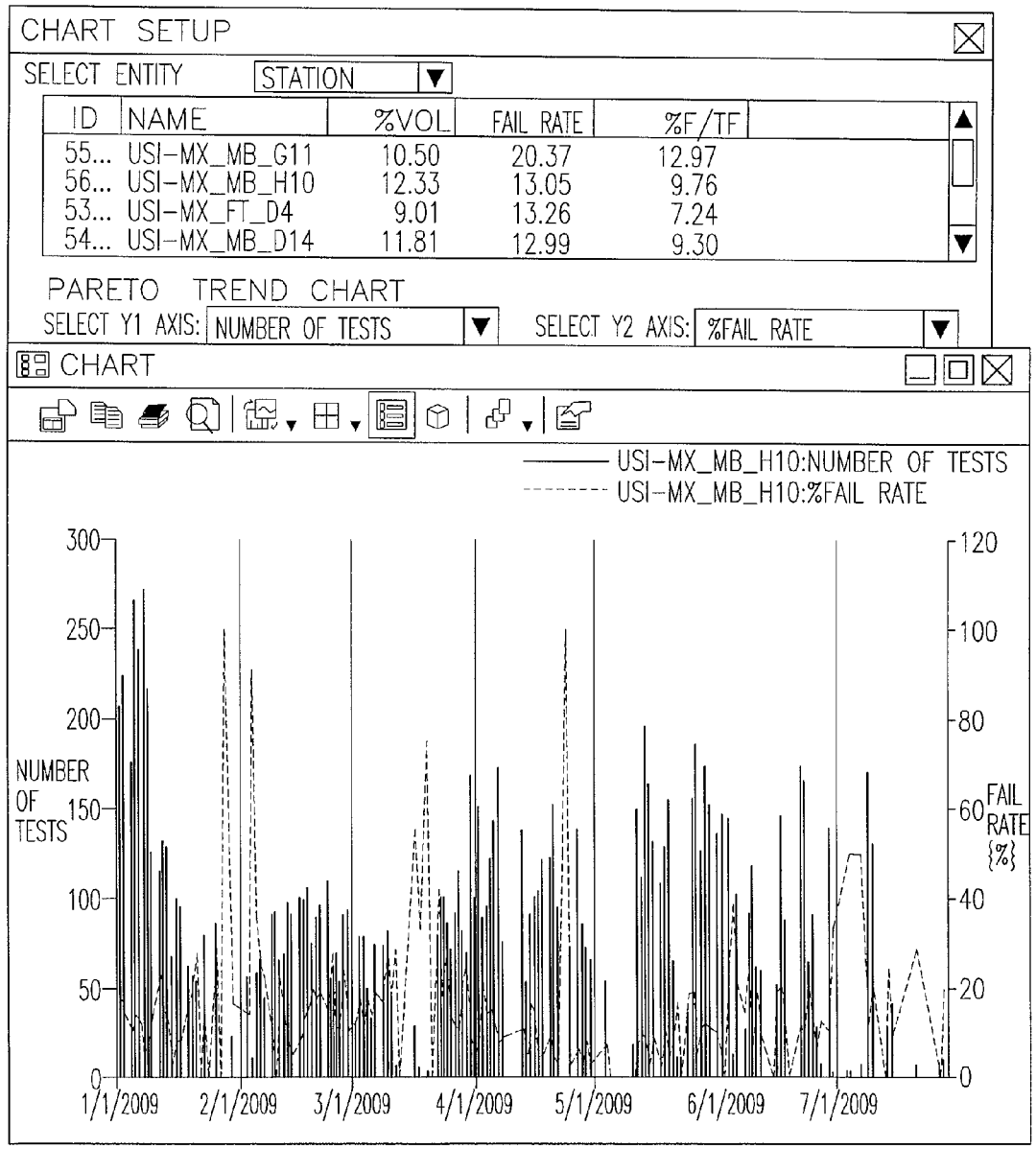
FIG. 16 depicts examples of unusual patterns, according to some embodiments of the present invention.

FIG. 16 depicts examples of unusual patterns, according to some embodiments of the present invention. Time trend analysis is used to investigate the behavior (trend) of a KPI for a selected factor/item over the time. For example, FIG. 16 shows that how volume and failure rate are changing over a period of 8 months for factor=Station, and Item=USI_MX_MB_H10 (one of the stations). The table in this figure shows that the average failure rate for this station is 13.05% over 8 months. The graph shows that the failure rate has been fluctuated between 5% and 100%.

Figure 17:
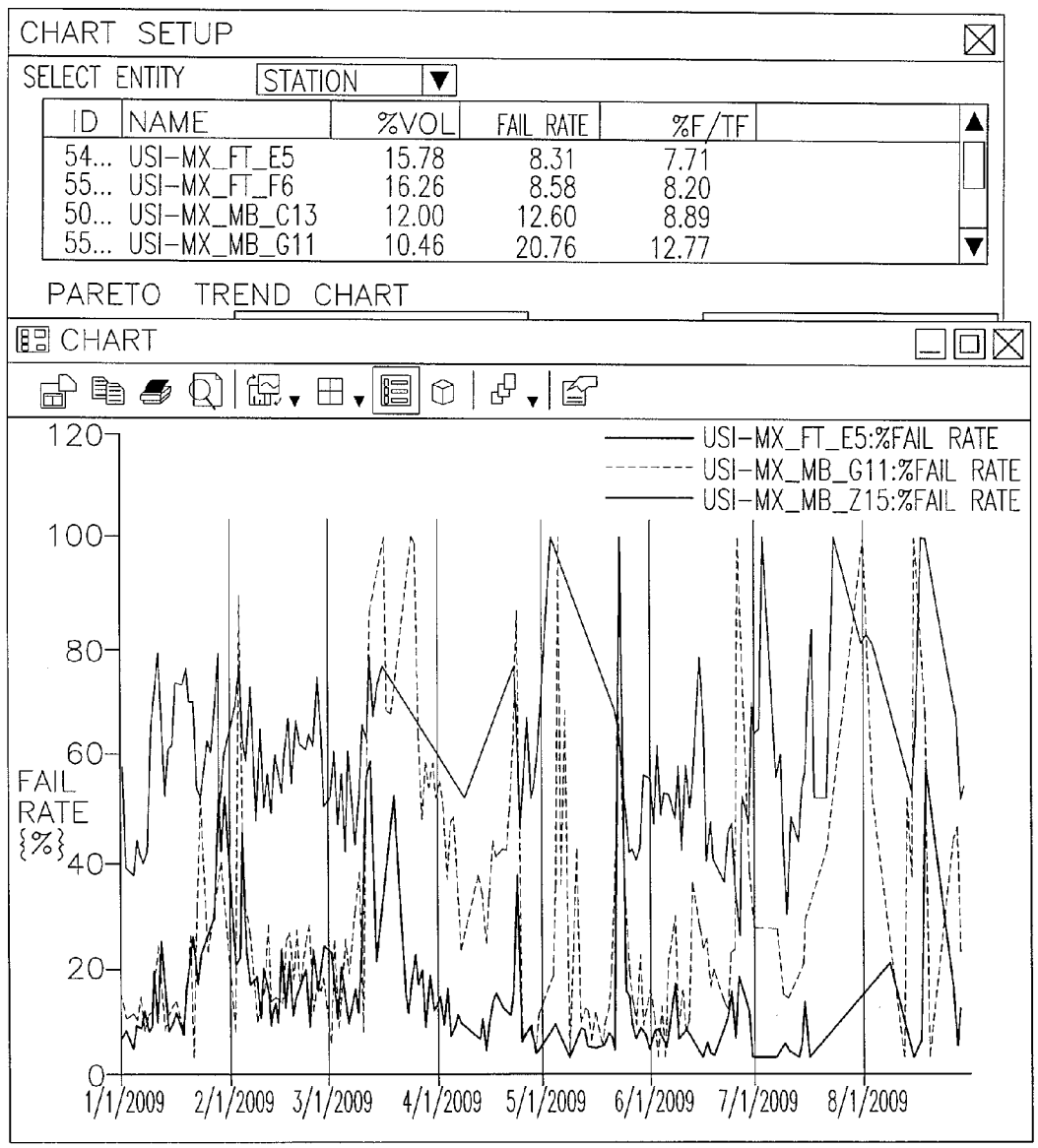
FIG. 17 shows an exemplary chart for time trend analysis, according to some embodiments of the present invention.

Another chart can be generated to compare a KPI performance over time for multiple items side-by-side. FIG. 17 shows an exemplary chart for time trend analysis, according to some embodiments of the present invention. As shown, the failure rate trend for three stations are visually depicted.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for supply chain data analysis, the method comprising:

storing supply chain data including test data, genealogy data including a component's parent and its supplier and a component's child and its supplier, repair data, a plurality of factors and a plurality of items, in one or more databases;

aggregating the stored supply chain data in a plurality of combinations including one or more items and one or more factors, by one or more computers;

selecting a portion of the plurality of factors from the stored data, and a time range for analysis;

selecting one or more criteria for analysis;

extracting a portion of the plurality of combinations according to selected one or more criteria, by the one or more computers;

analyzing said extracted portion of the plurality of combinations, by the one or more computers to detect a combination of factors and items that results in a test failure, according to said selected factors, said time range, and said extracted portion of the plurality of combinations;

detecting a root cause for said detected combination of factors and items, by the one or more computers;

performing correlation analysis between said extracted combinations, by the one or more computers;

performing trend analysis on said extracted combinations; and making recommendation for promising combinations and range of test parameters to maximize a yield for the selected factors, by the one or more computers.

2. The method of claim 1, further comprising performing an entropy-based function that shows the variations between items for each selected factor.

3. The method of claim 1, further comprising allocating resources including one or more of stations, fixtures, and operators to maximize resource utilization.

4. The method of claim 1, wherein the factors include one or more of the group consisting of product, product category, product version, test, subtest, measurement, station, station type, operator, assembly line, site, building, software version, hardware version, component, join, board version, fail category, error message, component parent, component supplier, component child, fail code, defect code, repair type, component, location of a component on a product, part number, lot name, lot size, customer, site, product, call reason, operator, defect code, severity, and failed component.

5. The method of claim 1, wherein said detecting a root cause comprises braking down a test measurement based on related factors and items.

6. The method of claim 1, further comprising performing genealogy analysis by breaking down a product to its components in a parent-child structure.

7. The method of claim 1, further comprising creating production plans based on a required number of units to be tested in a period of time, test time, and failure rate.

8. The method of claim 1, further comprising extracting test data, return and maintenance data, and supplier data, from the stored data.

9. The method of claim 1, further comprising extracting data insights from the stored data collected from test, return and repair, and supply chain processes.

10. The method of claim 1, further comprising performing what-if analysis on the selected factors according to said detected combination of factors.

11. The method of claim 1, further comprising electronically allocating resources including one or more of stations, fixtures, and operators according to one or more desired functions selected by the user including one or more of minimize cost, minimize scrap, and minimize time-in-process, and outputting best one or more combinations that meet the selected desired functions.

12. The method of claim 1, wherein said extracting a portion of the plurality of combinations according to selected one or more criteria comprises retrieving factor properties from the stored data, integrating the retrieved factor properties to find different combinations of factors, retrieving subtest data to be matched with the different combinations, retrieving measurement data to be matched with the combinations, and determining genealogy, test structure, value structure and test limits.

13. The method of claim 1, further comprising accepting a threshold quantity and a threshold percentage for a group of data points that share same values for one or more of said selected factors, and displaying a bubble chart graph depicting a plurality of indicators with increasing sizes to illustrate more data in said group of data points.

14. A system for supply chain data analysis comprising:
one or more databases for storing supply chain data including test data, genealogy data including a component's parent and its supplier and a component's child and its supplier, a plurality of factors and a plurality of items;
an input device for selecting a portion of the plurality of factors from the stored data, and a time range for analysis, and selecting one or more criteria for analysis;
an extract & calculate module electrically coupled to the one or more databases for aggregating the stored supply chain data in a plurality of combinations including one or more items and one or more factors, and extracting a portion of the plurality of combinations according to selected one or more criteria; and
a multi-dimensional failure analysis module for analyzing said extracted portion of the plurality of combinations to detect a combination of factors and items that result in a test failure, according to said selected factors, said time range and said selected one or more criteria, detecting a root cause for said detected combination of factors and items, performing correlation analysis between said extracted combinations, performing trend analysis on said extracted combinations and making recommendation for promising combinations and range of test parameters to maximize a yield for the selected factors.

15. The system of claim 14, wherein the multi-dimensional failure analysis module is configured to perform an entropy-based function that shows the variations between items for each selected factor.

16. The system of claim 14, further comprising a test configuration analysis module for finding promising configurations and range of test parameters to maximize a yield.

17. The system of claim 14, wherein the multi-dimensional failure analysis module is configured to perform genealogy analysis by breaking down a product to its components in a parent-child structure.

18. The system of claim 16, wherein the test configuration analysis module is configured to create production plans based on a required number of units to be tested in a period of time, test time, and failure rate.

19. The system of claim 14, wherein the extract & calculate module is configured to extract data insights from the stored data collected from test, return and repair, and supply chain processes.

20. The system of claim 14, further comprising a production planning module for allocating resources including one or more of stations, fixtures, and operators according to one or more desired functions selected by the user including one or more of minimize cost, minimize scrap, and minimize time-in-process, and outputting best one or more combinations that meet the selected desired functions.

21. The system of claim 14, wherein the extract & calculate module is further configured to retrieve factor properties from the stored data, integrate the retrieved factor properties to find different combinations of factors, retrieve subtest data to be matched with the different combinations, retrieve measurement data to be matched with the combinations, and determine genealogy, test structure, value structure and test limits.

22. The system of claim 14, wherein the input device is configured to accept a threshold quantity and a threshold percentage for a group of data points that share same values for one or more of said selected factors, the system further comprising a display for displaying a bubble chart graph depicting a plurality of indicators with increasing sizes to illustrate more data in said group of data points.

* * * * *